Figure 1:
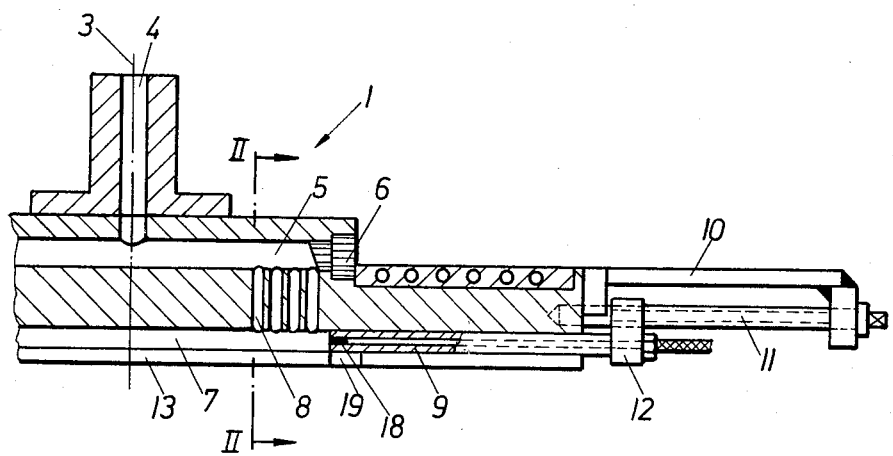

United States Patent

Huesing

[15] 3,684,422
[45] Aug. 15, 1972

[54] FISHTAIL DIE FOR PRODUCING THERMOPLASTIC FILMS AND SHEETS

[72] Inventor: Heinz Huesing, Kreis Heidenheim, Germany

[73] Assignee: Firma J. M. Voith GmbH, Heidenheim, Germany

[22] Filed: March 17, 1970

[21] Appl. No.: 20,221

[52] U.S. Cl. .............................. 425/466, 425/461
[51] Int. Cl. ........................................ B29d 7/04
[58] Field of Search ........ 18/13 R, 13 P, 12 DS, 13 D

[56] References Cited

UNITED STATES PATENTS

| 3,555,128 | 1/1971 | Schrenk | 18/13 R |
| 3,444,031 | 5/1969 | Schrenk | 18/13 P X |
| 2,972,359 | 2/1961 | Joukainen et al. | 18/12 DS X |
| 3,132,377 | 5/1964 | Allenbaugh et al. | 18/12 DS |
| 3,308,222 | 3/1967 | Kovacs | 18/12 DS X |
| 1,350,722 | 8/1920 | Goodenberger | 18/12 DS |

Primary Examiner—J. Spencer Overholser
Assistant Examiner—David S. Safran
Attorney—Edmund M. Jaskiewicz

[57] ABSTRACT

A fishtail die comprises a first distribution channel extending the length of the die and communicating to a thin slit through which a thermoplastic material is extruded in sheet form. A second distribution channel extends less than the length of the die and communicates with the first distribution channel through a series of bores and to a feed passage through which the thermoplastic material is supplied to the die. The first distribution channel may be provided with adjustable piston-like members to vary the width of a sheet being extruded through the slit.

2 Claims, 2 Drawing Figures

PATENTED AUG 15 1972 3,684,422

INVENTOR.
HEINZ HUESING

Edmund M. Jaskiewicz
ATTORNEY.

FISHTAIL DIE FOR PRODUCING THERMOPLASTIC FILMS AND SHEETS

The present invention relates to the production of films and sheets from a thermoplastic material, more particularly, to a reinforced fishtail die or nozzle extruding such films and sheets in varying widths.

A synthetic thermoplastic material may be continuously worked in a screw conveyor so as to be compacted, deaerated, plastified and then fed through a wide-mouth extrusion nozzle or die assembly to form a sheet or film. Such a slotted extrusion die has been known as a fishtail die. The material is usually fed to the middle of the fishtail die and then distributed toward the ends thereof through a manifold or distribution channel. The sheet or film leaves the die in a heated, highly elastic condition and is passed onto a series of rollers of a conveyor on which it becomes rigid upon cooling. The sheet or film may be directly applied to a moving web to form a multi-layered sheet, such as in photographic films and papers.

Such a nozzle generally includes a distribution channel or manifold located just above the conveyor and positioned transverse thereto with the channel being connected to a feed passage in a T-shaped arrangement. The distribution channel communicates with an adjacent slit in a lip which extends substantially over the entire length of the nozzle and through which the thermoplastic material is extruded. The portion of the nozzle containing the distribution channel above the slit is sometimes referred to as the offset zone. This portion of the offset zone immediately above the slit has a width of approximately 3–6 mm and communicates with the slit which may have a width of approximately 0.35–0.6 mm. Such nozzles may have a length of up to 2.5 meters. The pressure under which the thermoplastic material is supplied to the nozzle is rather high and may range between 100–300 atmospheres. In presently known nozzles, this pressure acts upon relatively large surfaces between the distribution channel and the extrusion slit of the nozzle. The forces exerted by this pressure may cause some expansion or bulging of the slit between the portions of the nozzle body and also of the nozzle slit at its discharge opening. The expanding of the nozzle slit at its discharge opening can be compensated somewhat by the use of certain known devices, which may act upon the nozzle slit.

It is further known to provide such fishtail dies with devices for varying the length of the nozzle in order to adapt the nozzle for use with conveyor belts of different widths or to extrude sheets of varying widths. One such device may comprise moveably mounted pistons at the ends of the distribution channel so that lateral positioning of the pistons will vary the width of the sheet extruded from the slit. With such an adjustable nozzle any expansion of the slit is particularly disadvantageous since the required thickness between the moveable piston members and the walls of the distribution channel may be affected. Accordingly, in such adjustable nozzles, dead spaces may be formed within the nozzle wherein the thermoplastic material remains stationary and does not pass through the nozzle as required.

It is therefore the principal object of the present invention to provide a novel and improved fishtail die having increased rigidity and strength.

It is another object of the present invention to provide a fishtail die which eliminates any spread or expansion in the discharge slit resulting from the pressure at which the thermoplastic material is fed to the nozzle.

It is a further object of the present invention to provide a fishtail die whose discharge slit can be adjusted in length and thermoplastic material will be discharged along the entire length of the nozzle slit without any stoppages of the thermoplastic material within the nozzle.

According to one aspect of the present invention there is disclosed a fishtail die for the production of films and sheets from a thermoplastic material which may comprise a feed passage communicating with a distribution channel extending the length of the nozzle. An offset zone communicates with the discharge channel and means are provided adjacent the offset zone to form an extrusion slit which is narrower in width than the offset zone. A second distribution channel is provided within the nozzle and extends over less than the length of the nozzle with the second channel being positioned inwardly of the first channel. Both the first and second distribution channels are symmetrical with respect to the feed passage. Passage means comprising a plurality of bores or groups of bores interconnect both distribution channels in at least two different places so that a permanent connection is formed through the die in a direction transverse to the distribution channel to strengthen the die.

Where the first distribution channel is provided with moveable members adjacent its ends for varying the width of a film discharged therefrom, the second distribution channel may have a length which is approximately the minimum length of the adjustable first distribution channel and nozzle slit.

Figure 2:
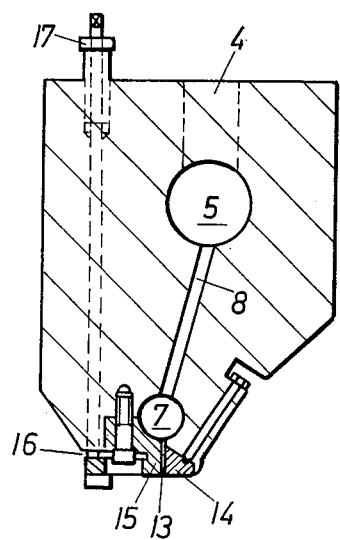

Other objects and advantages of the present invention will be apparent upon reference to the accompanying description when taken in conjunction with the following drawings, which are exemplary, wherein;

FIG. 1 is a longitudinal sectional view of one side of a die assembly incorporating the present invention; and FIG. 2 is a sectional view taken along the line II—II of FIG. 1.

Proceeding next to the drawings wherein like reference symbols indicate the same parts throughout the various views, a specific embodiment of the present invention will be described in detail.

As may be seen in FIG. 1 the fishtail die according to the present invention is indicated generally at 1 and is symmetrical with respect to the central axis 3 of a feed passage 4 through which the synthetic plastic material is supplied to the die from a screw conveyor or other source. The feed passage 4 connects to a distribution channel 5 positioned substantially at right angles to the feed passage 4 to form a T therewith and having a length corresponding to the minimum width of a sheet which can be formed with this nozzle. Both ends of the channel 5 are closed by suitable stoppers 6.

Parallel to the distribution channel 5 is another distribution channel 7 extending over the entire length of the nozzle. Groups of bores 8 connect both ends by channel 5 with channel 7.

Both ends of distribution channel 7 are provided with longitudinally moveable pistons 9 which form the edges of sheet material being extruded from the nozzle. From each end of the nozzle body there extend cross members 10 in which is rotatably mounted a threaded spindle 11 having a spindle nut 12 threaded thereon and connected to an outer extension of the piston 9. As result of this construction, rotation of the spindle 11 will axially move the nut 12 thereon and correspondingly move the piston 9 so as to adjust the length of the nozzle slit and, accordingly, the width of the plastic sheet being extruded.

The discharge opening of the nozzle comprises a slit 13 located within the lip zone and formed by means of interchangeable lip members 14 and 15. The lip member 15 forms a longitudinal slot 16 so that by means of an adjusting nut 17 the width of the slit 13 can be varied within certain limits.

The edge members or pistons 9 are provided with temperature sensing means 18 which enables the temperature of the thermoplastic material to be measured just before the material is discharged through the slit 13. The temperature of the thermoplastic material at this point is an important factor in obtaining extruded sheets and films of high quality and uniformity.

The underside of each edge member 9 is provided with a depending portion 19 which extends downwardly into the slit 13 to define the lateral edges of the slit.

The nozzle according to the present invention thus employs two parallel distribution channels with only the distribution channel remote from the discharge lip of the nozzle being connected directly to the supply of thermoplastic material. The only connection between the two distribution channels is a plurality of bores or other openings located in at least two places between these channels. Thus, as may be seen in FIG. 2, a permanent and solid connection is provided laterally through the nozzle body which adds significantly to the rigidity and strength of the nozzle structure. In the region of the nozzle body between the bores 8 there is a solid integral construction of the nozzle body which strengthens the entire nozzle. Various arrangements of bores and openings communicating the two distribution channels may be employed.

The construction of the nozzle disclosed herein thus subjects only a relatively small surface to the high supply pressure of the thermoplastic material being fed to the nozzle. Not only does the channel and bore construction disclosed herein strengthen the nozzle but favorably influences the flow characteristics of the thermoplastic material moving through the nozzle.

It is pointed out that the second distribution channel has a length corresponding approximately to the minimum length of the first distribution channel as defined by the adjustable edge members of pistons 9. Since the additional distribution channel is under ordinary conditions shorter than the entire length of the first distribution channel located adjacent to the discharge slit, considerable portions of the nozzle body remain in full cross section and thus provide substantial rigidity and strength to the outer portions of the nozzle and result in better sealing characteristics of the pistons in both the distribution channel and the discharge lip.

It is understood that this invention is susceptible to modification in order to adapt it to different usages and conditions, and accordingly, it is desired to comprehend such modifications within the invention as may fall within the scope of the appended claims.

What is claimed is:

1. In a fishtail die having a solid and integral die body for the production of film and sheets from a thermoplastic material, a combination in the die body of a feed passage, a first distribution channel extending substantially perpendicularly to said feed passage and communicating therewith, a second distribution channel substantially parallel to and in spaced relation with said first distribution channel, said second distribution channel extending over a greater distance than the length of the first distribution channel and defining the maximum width of a produced film or sheet, said first and second distribution channels being symmetrical with respect to said feed passage, a plurality of spaced bores in an integral portion of the die body interconnecting said first and second distribution channels to define a permanent and rigid connection laterally through the die in at least one point, and means for selectively adjusting the length of the second distribution channel down to an operating length corresponding substantially to that of said first distribution channel.

2. In a fishtail die as claimed in claim 1 wherein said length varying means comprises pistons positionable to the ends of the first distribution channel.

* * * * *